United States Patent
Yson et al.

(10) Patent No.: US 7,464,548 B2
(45) Date of Patent: Dec. 16, 2008

(54) SHAPE MEMORY ALLOY LINEAR ACTUATOR

(75) Inventors: Apolonio P. Yson, Cerritos, CA (US); Ross H. Messinger, Tustin, CA (US)

(73) Assignee: The Boeing Company, Chicago, IL (US)

( * ) Notice: Subject to any disclaimer, the term of this patent is extended or adjusted under 35 U.S.C. 154(b) by 402 days.

(21) Appl. No.: 11/290,364

(22) Filed: Nov. 30, 2005

(65) Prior Publication Data

US 2007/0119165 A1    May 31, 2007

(51) Int. Cl.
  *F01B 29/10* (2006.01)
  *F01B 7/20* (2006.01)

(52) U.S. Cl. .............. 60/527; 60/528; 92/51; 92/52

(58) Field of Classification Search ........... 60/527–529; 92/51–53
  See application file for complete search history.

(56) References Cited

U.S. PATENT DOCUMENTS

| | | | | |
|---|---|---|---|---|
| 3,012,882 | A | * | 12/1961 | Muldawer et al. ........... 148/402 |
| 3,174,851 | A | * | 3/1965 | Buchler et al. ............. 148/426 |
| 4,811,564 | A | * | 3/1989 | Palmer ........................ 60/527 |
| 5,127,228 | A |   | 7/1992 | Swenson |
| 5,306,979 | A | * | 4/1994 | Schwarz, Jr. ................ 310/328 |
| 6,065,934 | A |   | 5/2000 | Jacot et al. |
| 6,499,952 | B1 |  | 12/2002 | Jacot et al. |
| 6,832,477 | B2 |  | 12/2004 | Gummin et al. |
| 2002/0185932 | A1 | | 12/2002 | Gummin et al. |
| 2004/0020200 | A1 | | 2/2004 | Donakowski et al. |

FOREIGN PATENT DOCUMENTS

WO    WO 01/12985 A1    2/2001

OTHER PUBLICATIONS

UK Combined Search and Examination Report, Mar. 30, 2007, 5 pages.
M.D. Bokaie, V. Martynov, R. Turovskiy, *AIAA 95-2984 Shape Memory Alloys In Aerospace Applications*, 31st *AIAA/ASME/SAE/ASEE Joint Propulsion Conference and Exhibit*, Jul. 10-12, 1995, pp. 1-8, San Diego, CA.

* cited by examiner

*Primary Examiner*—Hoang M Nguyen
(74) *Attorney, Agent, or Firm*—Alston & Bird LLP

(57) ABSTRACT

Linear actuators including coupled elongate members formed of shape memory alloys are provided. Members that lengthen when heated are coupled to members that shorten when heated such that stroke amplification gains are derived from each member. The members may be tubular and may be coaxially arranged for telescopic extension and collapse. Sections of a modular structure such as a space vehicle may be latched and clamped together for assembly or for docking by utilizing linear actuators having shape memory alloys that are actuated thermally.

25 Claims, 8 Drawing Sheets

SHAPE MEMORY ALLOY LINEAR ACTUATOR

FEDERALLY SPONSORED RESEARCH OR DEVELOPMENT

This invention was made with Government support under contract number FA8650-04-C-7139 awarded by the United States Air Force. The government has certain rights in this invention.

FIELD OF THE INVENTION

Embodiments of the present invention relate generally to shape memory alloy actuators. More particularly, embodiments of the invention relate to telescoping assemblies of thermally actuatable tubular members.

BACKGROUND OF THE INVENTION

Shape memory alloys exhibit thermo-mechanical properties that are useful in constructing thermally actuatable devices. Generally, a shape memory alloy (SMA) is a metallic alloy that has distinctly different phases on opposing sides of a transition temperature. An SMA reaches a first physical state when it is below its transition temperature and a second physical state when it is above its transition temperature. The warmer second physical state is generally thought to have higher degrees of solid-phase crystalline order and symmetry than the cooler first physical state. The first and second states are typically referred to respectively as martensitic and austenitic states or phases in literature related to SMA technologies.

Though a transformation from one of these states to the other does not necessarily produce an observable macroscopic shape change, some SMA materials can be trained to have a first shape for the cooler first state and a second shape for the warmer second state. A two-way trained SMA can forcibly assume the second shape when heated above the transition temperature and then gently return, if not otherwise restricted, to the first shape when cooled to below the transition temperature.

Training an SMA object entails imparting shape memory into the object by restraining the object into a particular shape and thermally setting that shape, for example by heating the object to five hundred degrees Celsius or more. Two-way training typically entails thermo-mechanical cycles wherein the object is forced into the desired martensitic and austenitic shapes at respective low and high temperatures. The most commonly used SMA appears to be an alloy called Nitinol that is approximately fifty six percent (by weight) nickel and forty four percent titanium. Other available shape memory alloys include copper-zinc-aluminum, and copper-aluminum-nickel. The transition temperature of an SMA is highly sensitive to the composition of the alloy and can be selected by slightly varying the constituent ratios. Transition temperatures for Nitinol can reportedly be selected between negative one hundred and fifty degrees Celsius and positive one hundred and fifty degrees Celsius. Transformations typically take place over several minutes of time.

Applying these principles, SMA materials are utilized in constructing devices that do work when heated to transform from martensitic to austenitic phases. SMA materials are typically slower acting than such devices as electromechanical motors and hydraulic and pneumatic actuators, but SMA materials are highly reliable, generally require relatively few parts, and are weight efficient when compared to motors and the like. An object such as a wire formed of an SMA can be trained, for example, to shorten when heated. Such a wire can pull a load to do work. The wire can be heated by ohmic heating produced by passing an electrical current through the wire. Thus a current-actuated tensional actuator can be constructed of less parts than a conventional winching system. Typical available SMA devices include flexible wires or fibers that shorten when heated. While an object formed of an SMA can as well be trained to expand when heated, training rigid SMA members to expand longitudinally to do work when heated does not appear to be an avenue well explored by currently available SMA devices which include rotary and linear devices.

Rotary SMA devices are described in the U.S. Pat. No. 6,065,934, issued to Jacot et al. on May 23, 2004, and in the U.S. Pat. No. 6,499,952B1 issued to Jacot et al. on Dec. 31, 2002, which patents are incorporated herein by reference. The described rotary devices include torque tubes, formed with SMA materials, that twist when heated. The torque tubes work in conjunction with return springs that rotationally reset the tubes when thermal conditions allow. The described devices are useful in rotor-blade twist systems of helicopters and perhaps wherever thermally invoked torque would be useful.

Rotary and linear SMA devices are described in the U.S. Patent Application Publication No. US2002/0185932A1 of Gummin et al., published on Dec. 12, 2002, which patent application publication is incorporated herein by reference. A linear device described includes an arrangement of parallel bars interconnected by SMA wires that shorten when heated. The device effectively sums the decrements in the lengths of the wires by moving a bar a greater distance than any one wire shortens. The reference refers to this benefit as stroke amplification. The bars, however, do not exhibit SMA properties and so the stroke amplification gained, and the work accomplished by the device, are derived from the properties of the SMA wires.

A need exists for an SMA linear actuator that provides improved stroke amplification by deriving gains from interconnected members of an assembly. A need exists for linear actuator assemblies that are adaptable to both pushing and pulling applications.

BRIEF SUMMARY OF THE INVENTION

Embodiments of the invention address the above needs and achieve other advantages by providing a linear actuator deriving stroke amplification gains from the members of an interconnected assembly. In particular, the linear actuator includes a first SMA member and a second SMA member that are coupled together such that, when the first member is thermally actuated, a portion of the second member travels relative to a portion of the first member.

In one embodiment, a linear actuator includes a first member configured to shorten when heated, and a second member configured to lengthen when heated. The members are coupled together such that the second member travels relative to a proximal end of the first member when the first member shortens. The second member may have a proximal end and a distal portion coupled to the first member such that the distal portion travels a first distance relative to the proximal end of the first member when the first member shortens. The proximal end of the second member may travel a second distance relative to the distal portion of the second member when the second member lengthens. The proximal end of the second member may travel a third distance relative to the proximal end of the first member when the first member shortens and the second member lengthens, wherein the third distance is at least as great as the sum of the first distance and the second distance. The first member can be formed of a first SMA having a first transition temperature, and the second member can be formed of a second SMA having a second transition temperature. The first and second transition temperatures may be approximately the same, or may be different.

In another embodiment, a thermally actuatable telescoping assembly includes a tubular first member and a second member at least partially surrounded by the tubular first member. The first member and second member include respective first and second shape memory alloys and are operably coupled together such that a portion of the second member moves linearly relative to the first member when the assembly is thermally actuated. The first member and second member may be operably coupled together by a third member that includes a third shape memory alloy. The first member may be configured to shorten when the first SMA is heated, the second member may be configured to shorten when the second SMA is heated, and the third member may be configured to lengthen when the third SMA is heated.

In yet another embodiment, a thermally actuatable coaxial assembly includes an elongate first member disposed along an axis, an elongate second member disposed along the axis, and an intervening member disposed along the axis coupling the first member to the second member. The first member has a first proximal portion, a first distal portion, and a first SMA. The second member has a second proximal portion, a second distal portion, and a second SMA. The intervening member operably couples the first distal portion to the second proximal portion such that the second proximal portion is moved forcibly along the axis by the intervening member relative to the first proximal portion when the first SMA is thermally actuated. The first distal portion may be tubular, and a portion of the intervening member may be disposed within the tubular first distal portion. A portion of the intervening member may be tubular, and a portion of the second member may be disposed within the tubular portion of the intervening member.

BRIEF DESCRIPTION OF THE SEVERAL VIEWS OF THE DRAWINGS

Figure 1:
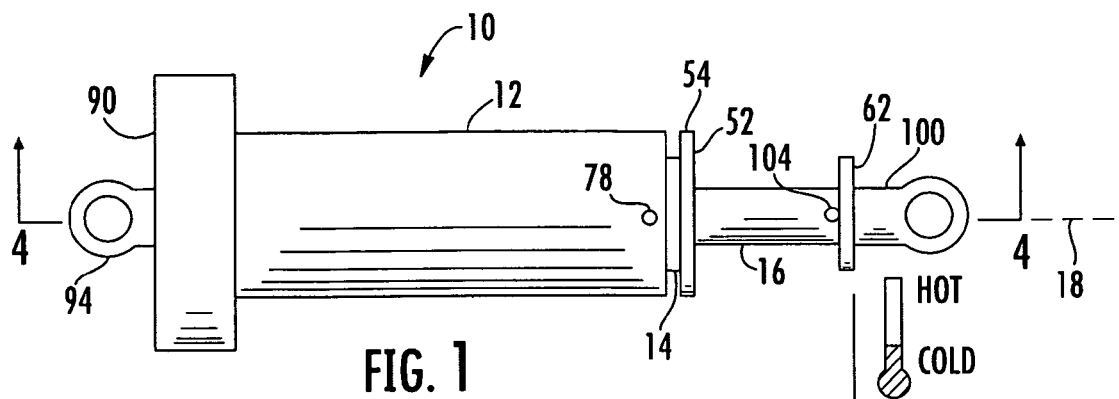
Figure 2:
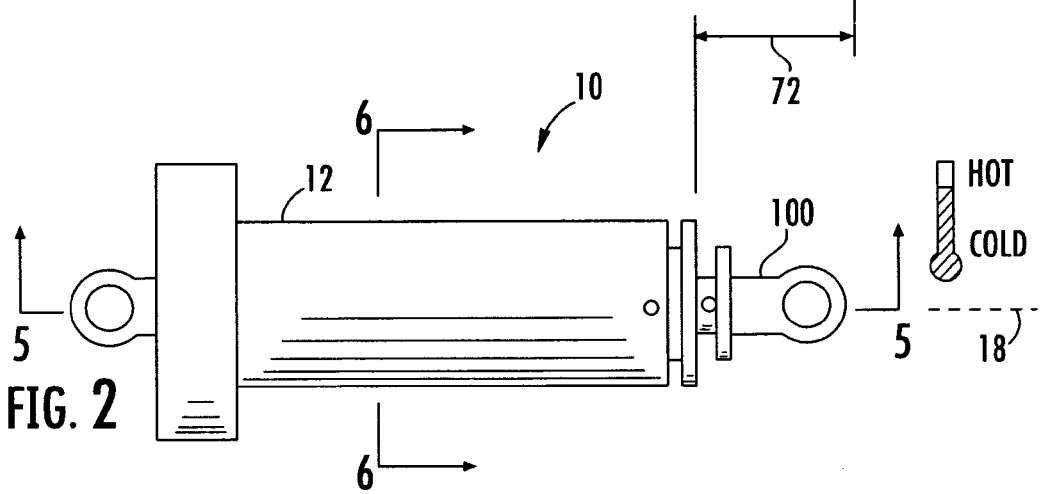
Figure 3:
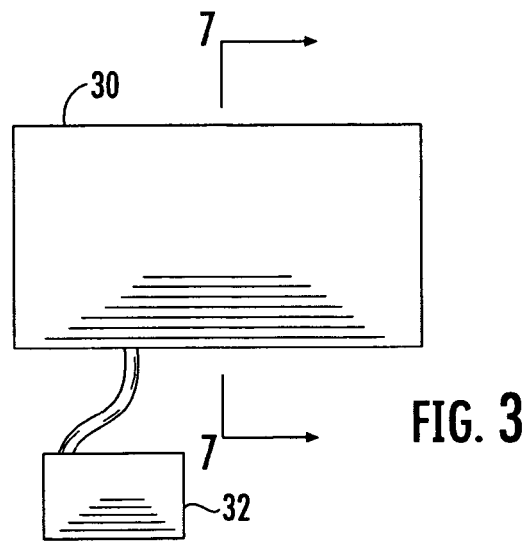
Figure 4:
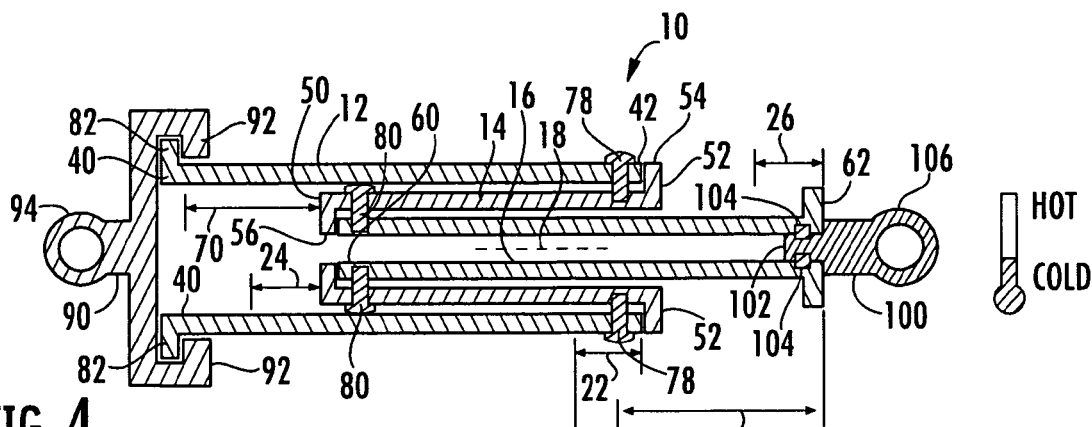
Figure 5:
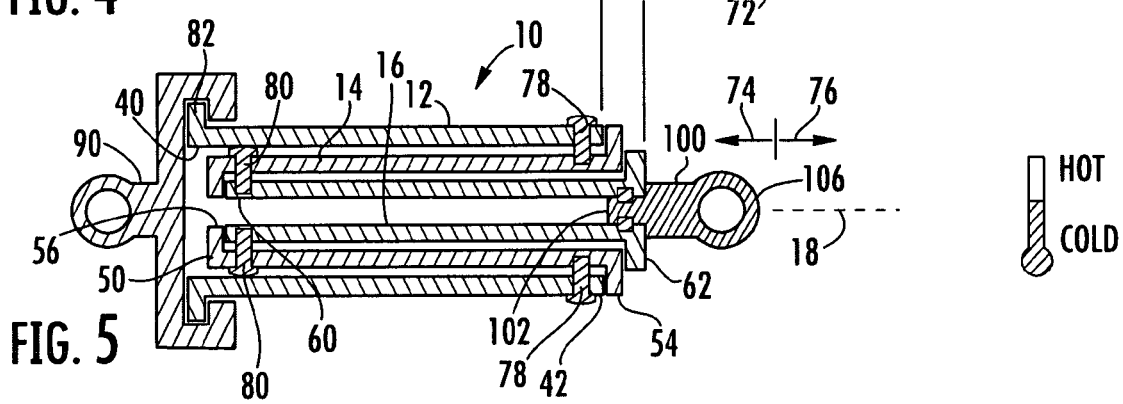
Figure 6:
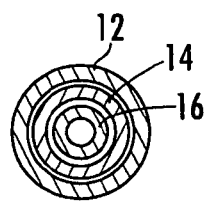
Figure 7:
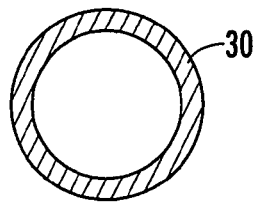
Figure 8:
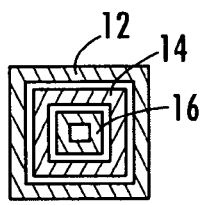
Figure 9:
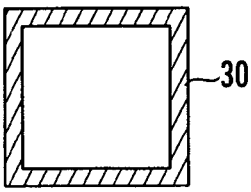
Figure 10:
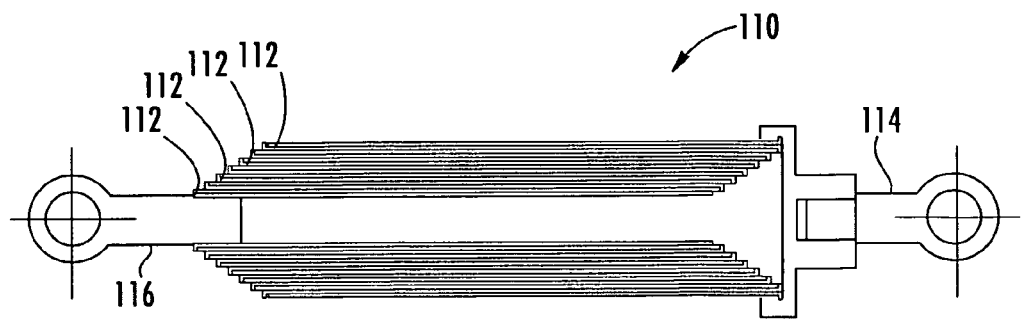
Figure 11:
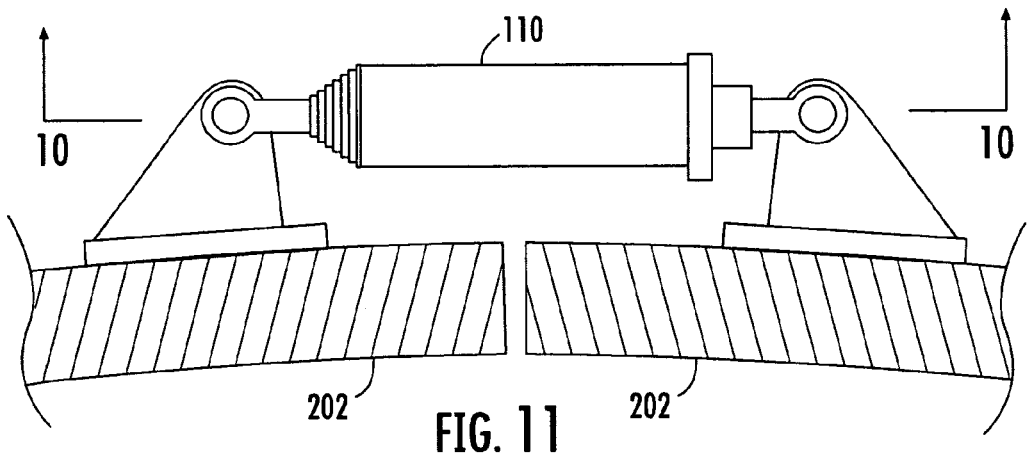
Figure 12:
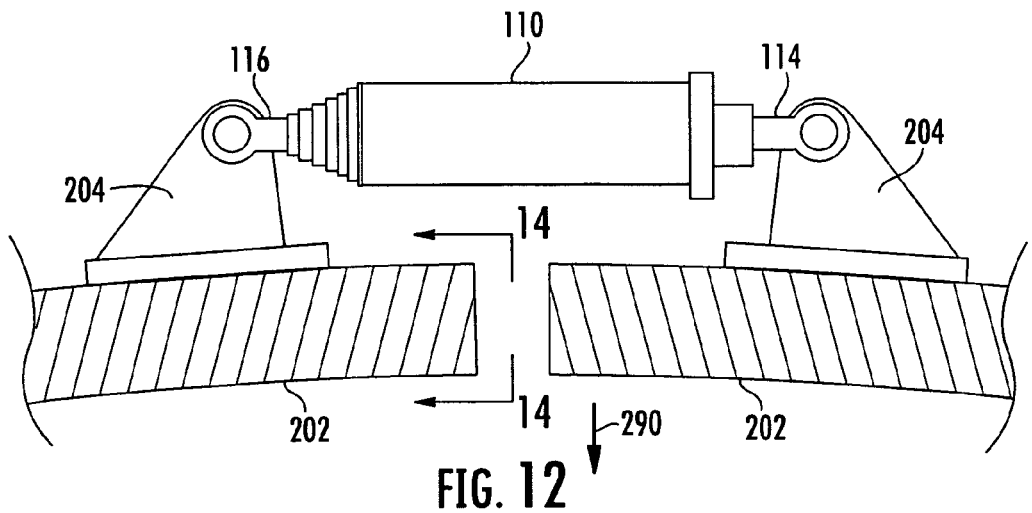
Figure 13:
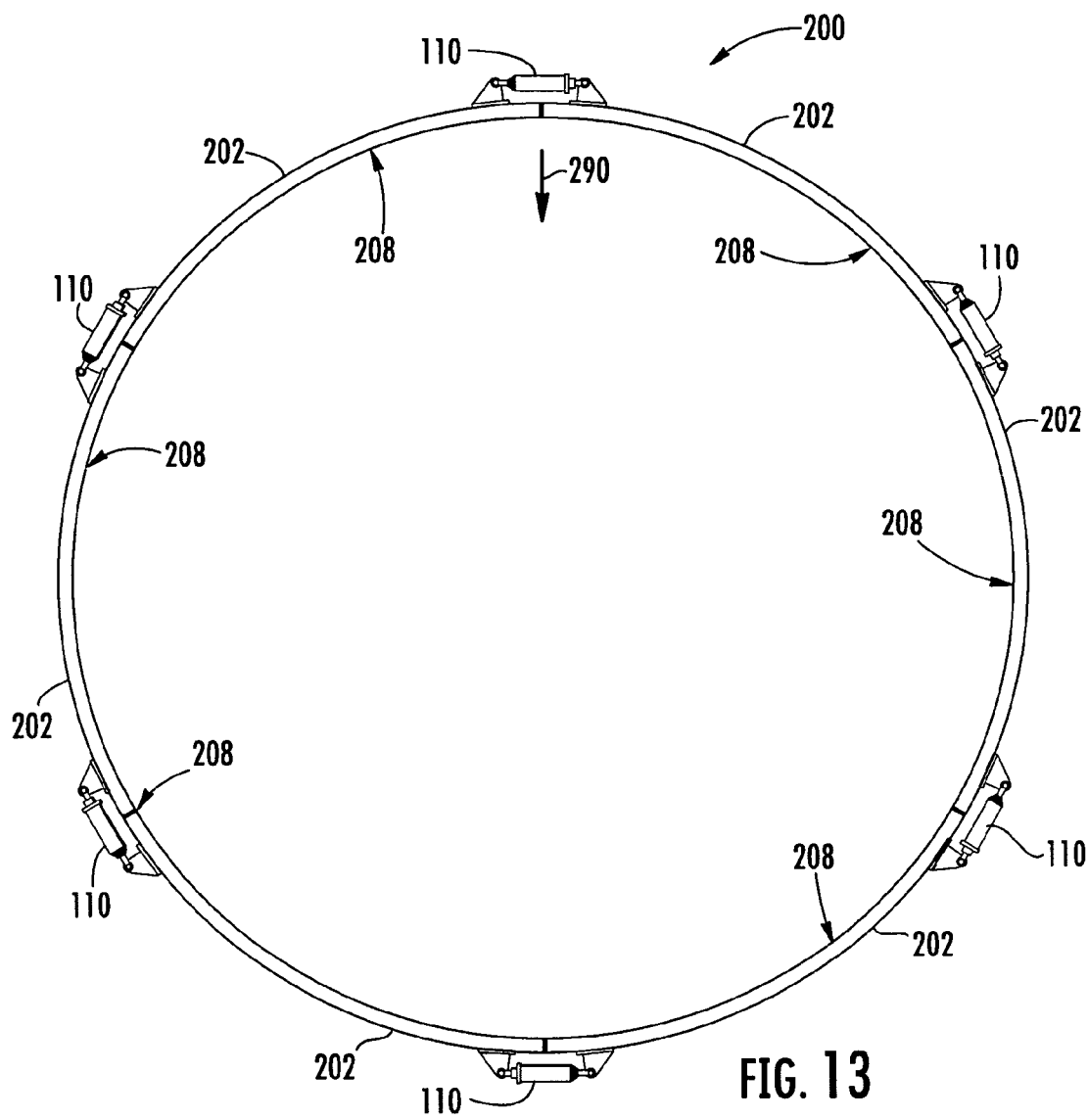
Figure 14:
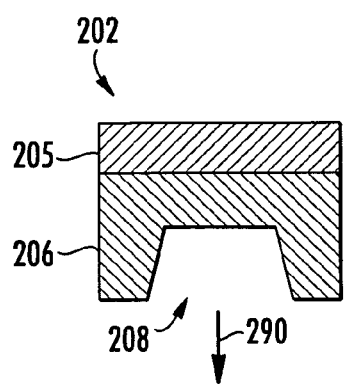
Figure 15:
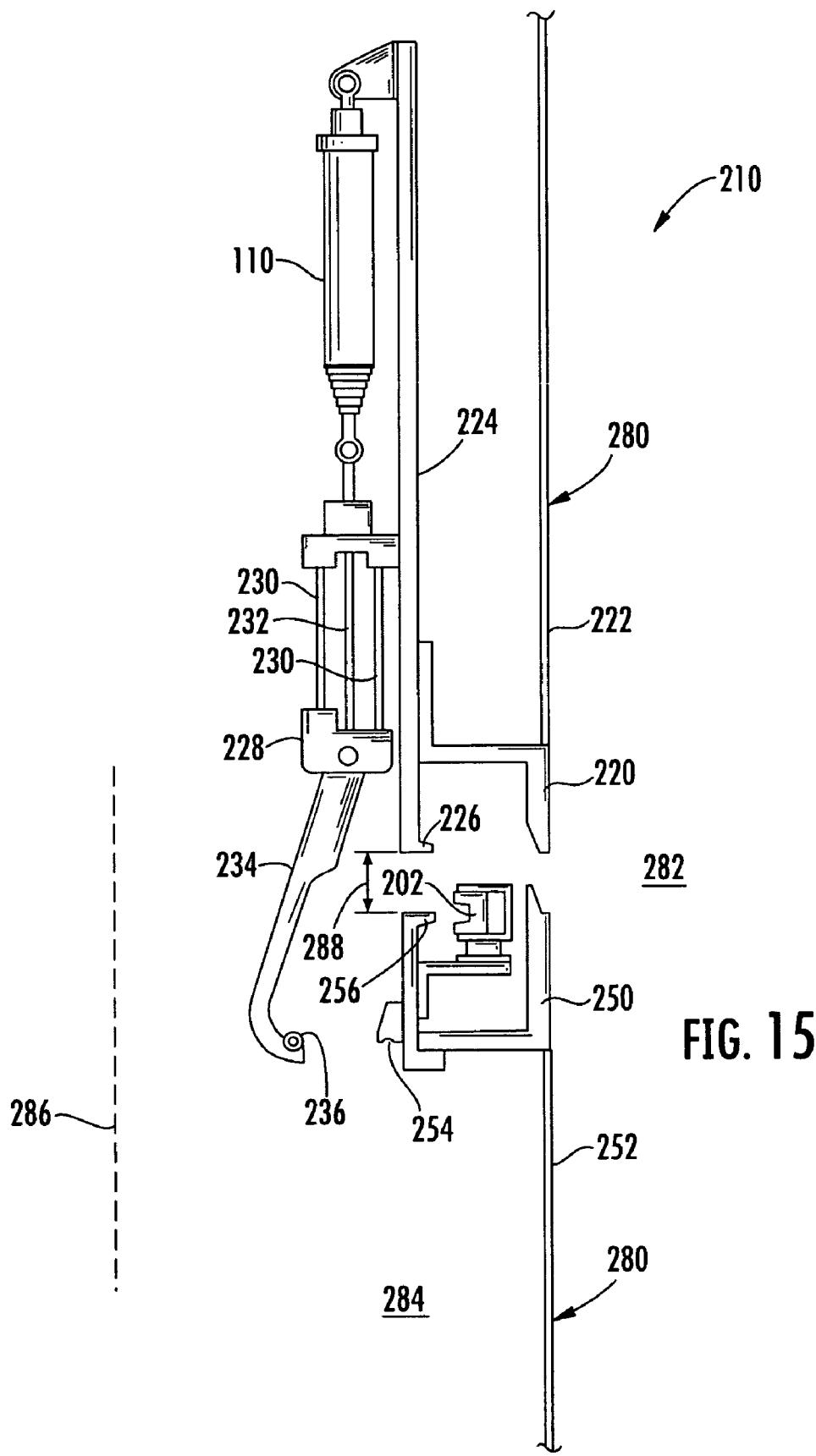
Figure 16:
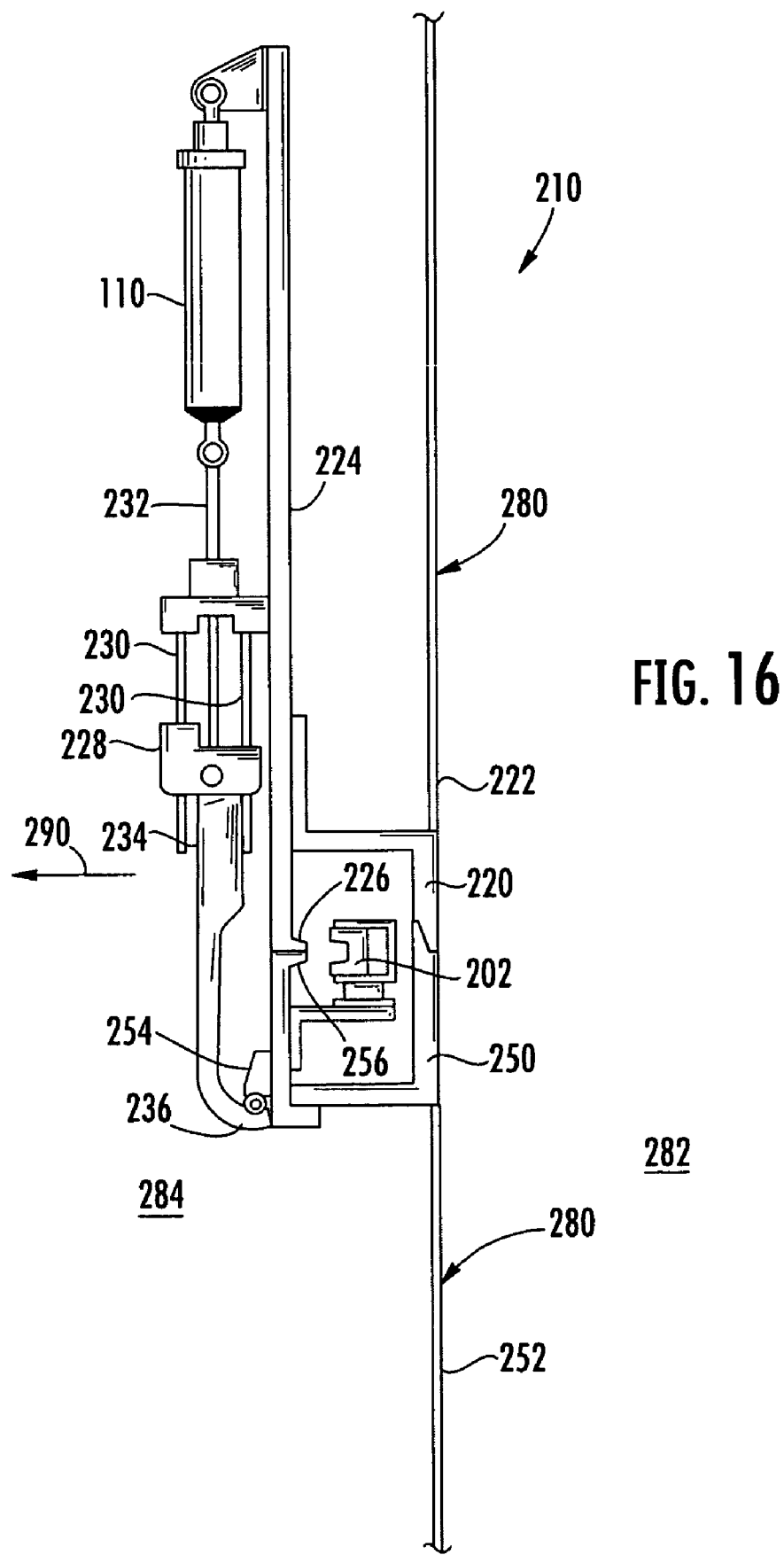

Having thus described the invention in general terms, reference will now be made to the accompanying drawings, which are not necessarily drawn to scale, and wherein:

FIG. 1 is a plan view of an actuator, according to an embodiment of the invention, shown telescopically extended;

FIG. 2 is a plan view of the actuator of FIG. 1, shown telescopically collapsed;

FIG. 3 is a plan view of an embodiment of a thermal element for thermally actuating the actuator of FIG. 1;

FIG. 4 is a cross-sectional view of the extended actuator of FIG. 1, taken upon the plane indicated by the line 4 in FIG. 1, and viewed transversely to the longitudinal axis of the actuator;

FIG. 5 is a cross-sectional view of the collapsed actuator of FIG. 2, taken upon the plane indicated by the line 5 in FIG. 2, and viewed transversely to the longitudinal axis of the actuator;

FIG. 6 is a cross-sectional view of the collapsed actuator of FIG. 2, taken upon the plane indicated by the line 6 in FIG. 2, viewed along the longitudinal axis of the actuator, and showing optionally circular tubular members;

FIG. 7 is a cross-sectional view of the thermal element of FIG. 3, taken upon the plane indicated by the line 7 in FIG. 3, showing an optionally circular thermal element for use with the circular tubular members of FIG. 6;

FIG. 8 is a cross-sectional view of the collapsed actuator of FIG. 2, taken upon the plane indicated by the line 6 in FIG. 2, viewed along the longitudinal axis of the actuator, and showing optionally rectangular tubular members;

FIG. 9 is a cross-sectional view of the thermal element of FIG. 3, taken upon the plane indicated by the line 7 in FIG. 3, showing an optionally rectangular thermal element for use with the rectangular tubular members of FIG. 8;

FIG. 10 is a cross-sectional view of an actuator, according to another embodiment of the invention, taken upon the plane indicated by the line 10 in FIG. 11, showing more tubular members than the embodiment of FIG. 1;

FIG. 11 is a plan view of the actuator of FIG. 10 attached to arc sections of the clamping ring of FIG. 13, the actuator shown telescopically collapsed for closing the clamping ring;

FIG. 12 is a plan view of the actuator of FIG. 10 attached to arc sections of the clamping ring of FIG. 13, the actuator shown telescopically extended for opening the clamping ring;

FIG. 13 is a plan view of a clamping ring for clamping together cylindrical portions of a space vehicle or assembly;

FIG. 14 is a cross-sectional view of an arc section of the clamping ring of FIG. 13, taken upon the plane indicated by the line 14 in FIG. 12, showing a clamping channel of the arc section;

FIG. 15 is a partial side view of cylindrical sections of a space vehicle or assembly shown ready for docking;

FIG. 16 is a partial side view of the sections of FIG. 14 shown latched together by actuation of the linear actuator of FIG. 10.

Figure 17:
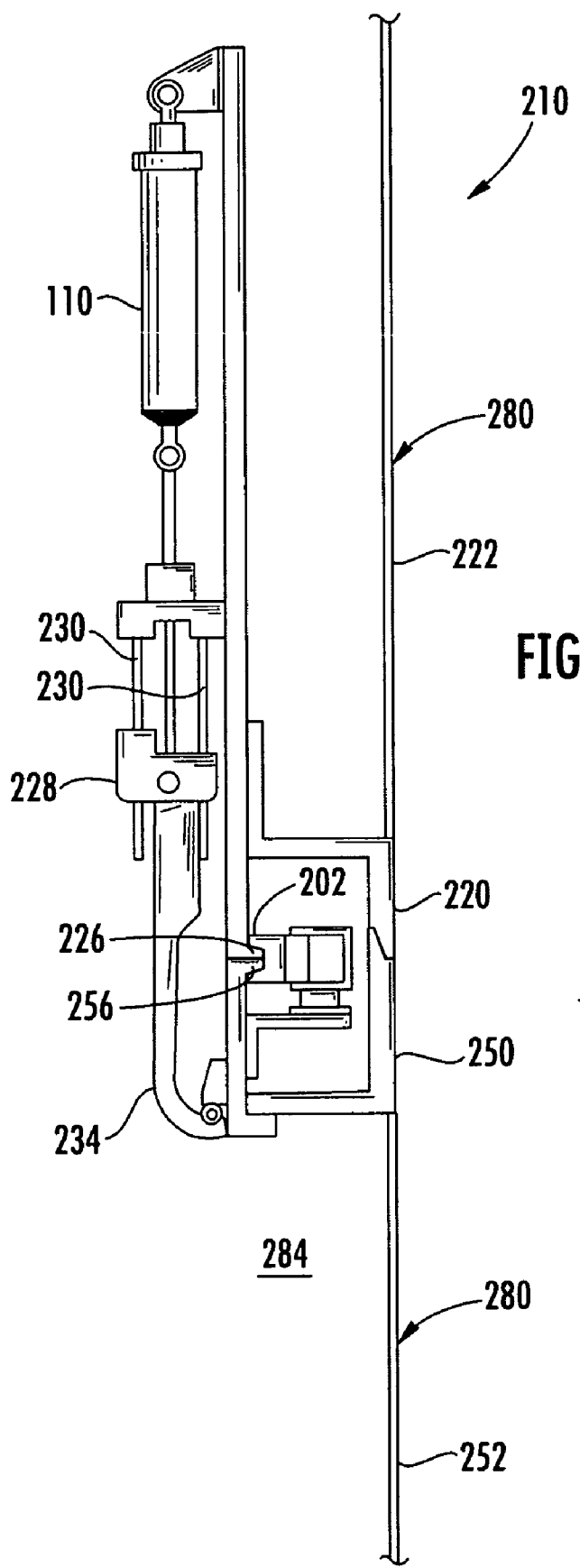
Figure 18:
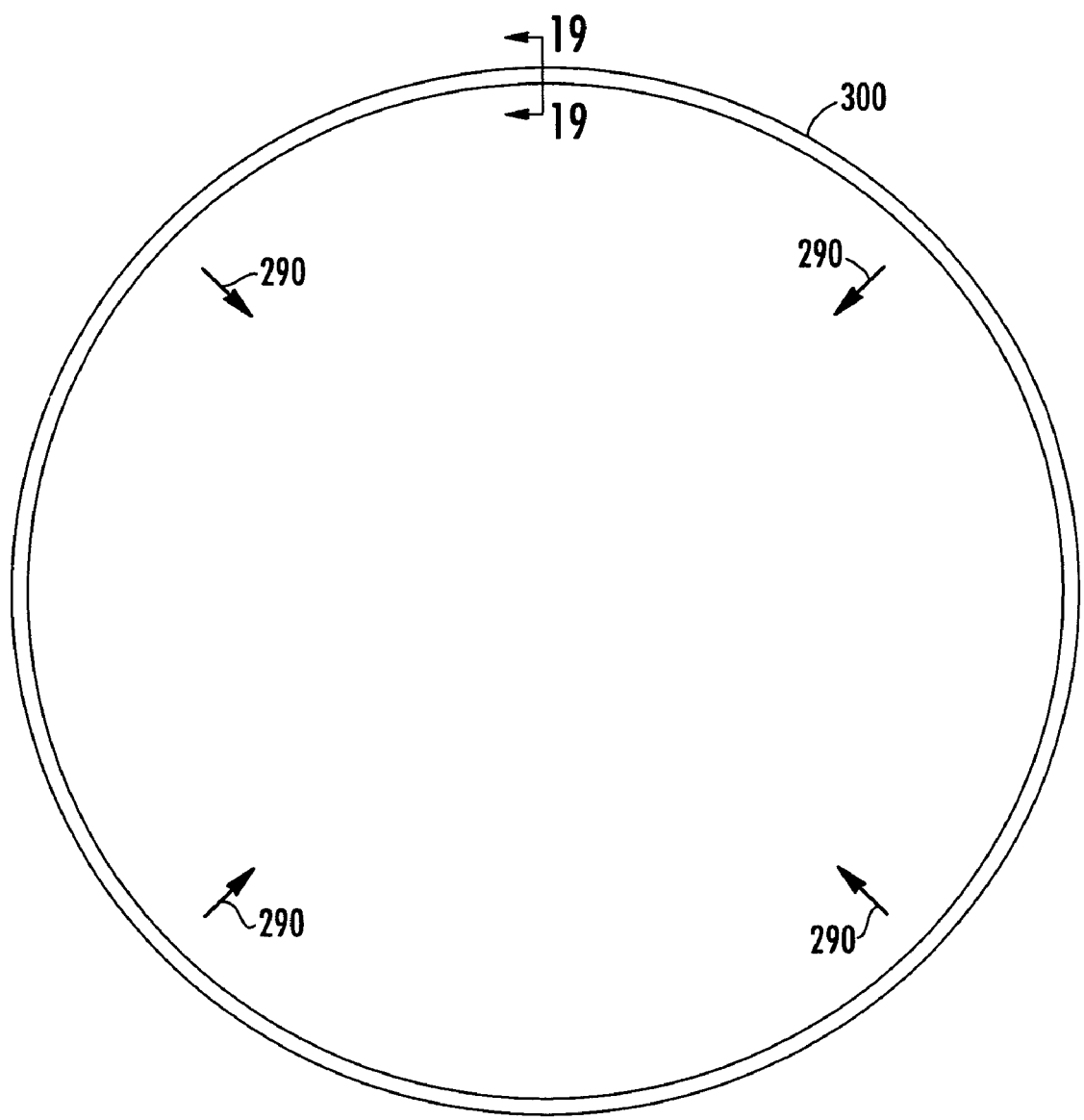
Figure 19:
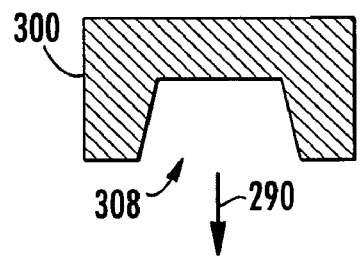

FIG. 17 is a partial side view of the sections of FIG. 14 shown clamped together by the clamping ring of FIG. 13;

FIG. 18 is a plan view of a clamping ring for clamping together cylindrical portions of a space vehicle or assembly; and FIG. 19 is a cross-sectional view of an arc section of the clamping ring of FIG. 18, taken upon the plane indicated by the line 19 in FIG. 18, showing a clamping channel of the arc section.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Referring now to the drawings, a linear actuator 10 according to an embodiment of the invention is shown in FIGS. 1-4, and in respectively correlated cross-sectional views in FIG. 4-5. The actuator 10 comprises an elongate first member 12, an elongate second member 14 (FIGS. 3-4), and an elongate third member 16, each disposed about a longitudinal axis 18. The first member 12, the second member 14, and the third member 16 include in their constructions one or more shape memory alloys such that each changes in length when thermally actuated. The actuator 10 is shown telescopically extended in FIG. 1 and FIG. 4, and telescopically collapsed in FIG. 2 and FIG. 5. The actuator 10 can be thermally actuated from the extended state of FIG. 1 to the collapsed state of FIG. 2 by changing the temperatures of the first member 12, the second member 14, and the third member 16. The actuator 10 is reversible in that it can be thermally actuated to return to the extended state of FIG. 1 from the collapsed state of FIG. 2 by reversing the temperature changes.

Thermal actuation as used herein refers to dimensional changes invoked by temperature changes. The actuators described herein generally exhibit a work stroke when heated, taking advantage of the tendencies of trained SMA materials to forcibly assume austenitic states when heated above their transition temperatures. The actuators described herein generally exhibit self-resetting benefits, taking advantage of the tendencies of two-way trained SMA materials to intrinsically return to martensitic states when cooled. Thermal actuation as used herein relates equally to heating and cooling an SMA material across its transition temperature to invoke a transformation between martensitic and austenitic states. Thus thermal actuation can entail a work stroke actuation caused by an increase in temperature and a device reset actuation caused by a decrease in temperature.

The first member 12, second member 14, and third member 16 are each generally tubular and are nested concentrically about the longitudinal axis 18 for telescopic expansion (FIG. 4) and collapse (FIG. 5). The generally tubular members can have almost any cross-sectional shape. As shown in cross-sectional view in FIG. 6, the first member 12, second member 14, and third member 16 can each have generally arcuate cross-sectional shapes to define, for example, ellipses or circles when viewed along the longitudinal axis. Alternatively, as shown in FIG. 8, the first member 12, second member 14, and third member 16 can each define generally polygonal cross-sectional shapes having almost any number of planar sides. In FIG. 8, the first member 12, second member 14, and third member 16 are shown as rectangular in cross-section, or more particularly square. A tubular member in these descriptions generally relates to an elongate member defining an elongate internal conduit that may receive or be received by one or more other elongate members or portions thereof, without regard to the particular cross-sectional shape of the tubular member or internal conduit. Thus, the term tubular is used herein without limitation to any particular cross-sectional shape.

The linear actuator 10 comprising a thermally actuatable telescoping assembly of elongate tubular members 12, 14, and 16, is adaptable to both pulling and pushing applications as needed and according to the respective trainings of the members 12, 14, and 16. Exemplary scenarios for applying an actuator are set forth in these descriptions with references to FIGS. 11-17. The scenarios relate specifically to a telescoping assembly of tubular members that does work when heated by collapsing and pulling objects together. In the context of these scenarios, the actuator 10 generally forcibly telescopically collapses (FIG. 2, FIG. 5) when heated and telescopically extends (FIG. 1, FIG. 4) when cooled. More particularly, the first member 12 has been thermo-mechanically trained to shorten when heated and lengthen when cooled. The second member 14, unlike the first member, has been thermo-mechanically trained to lengthen when heated and shorten when cooled. The third member, like the first member, has been thermo-mechanically trained to shorten when heated and lengthen when cooled.

It should be understood that each member could be oppositely trained and that the actuator 10 could forcibly telescopically extend when heated and telescopically collapse when cooled. Thus, the following descriptions of the actuator 10 are to be taken in the context of the exemplary scenarios of FIGS. 11-17 and should not be construed toward limiting the actuator 10 to a device that pulls when heated. Indeed, the actuator 10 can as well be trained to push when heated.

The first member 12 is formed of a first SMA that obtains a martensitic state (FIG. 4) when disposed below a first transition temperature and an austenitic state (FIG. 5) when disposed above the first transition temperature. In the illustrated embodiment, the first member 12 is two-way trained such that it forcibly shortens when heated (FIG. 5) and intrinsically lengthens when subsequently cooled (FIG. 4). In particular, the first member shortens by a first distance 22 (FIG. 4) when heated (FIG. 5) from below the first transition temperature to above the first transition temperature. Thus, in the actuator 10 that is configured to pull when heated, the first member is trained to forcibly shorten when heated. In an actuator configured to push when heated, the first member could be trained to forcibly lengthen when heated.

In comparison to the first member 12, the second member 14 responds rather oppositely to temperature fluctuations about a transition temperature. The second member comprises a second SMA and is two-way trained such that it forcibly lengthens by a second distance 24 (FIG. 4) when heated (FIG. 5) and intrinsically shortens when subsequently cooled (FIG. 4). Thus, in the actuator 10 that is configured to pull when heated, the second member is trained to forcibly lengthen when heated. In an actuator configured to push when heated, the second member could be trained to forcibly shorten when heated.

The third member 16, somewhat like the first member, shortens when heated. That is, the third member comprises a third SMA and is two-way trained such that it forcibly shortens by a third distance 26 (FIG. 4) when heated (FIG. 5) and intrinsically lengthens when subsequently cooled (FIG. 4). Thus, in the actuator 10 that is configured to pull when heated, the third member is trained to forcibly shorten when heated. In an actuator configured to push when heated, the third member could be trained to forcibly lengthen when heated.

It should be understood that the first member 12, second member 14, and third member 16 can simultaneously or separately assume their respective heated austenitic states (FIG. 5). For a first example, the first, second and third transition temperatures can all be approximately the same and the actuator 10 can be uniformly heated such that the three members thermally actuate simultaneously. For a second example, the first, second and third transition temperatures can all be approximately the same and the actuator 10 can be non-uniformly heated such that the three members thermally actuate at separate times. This second example relates to a chronologically staged actuator that increasingly collapses over time when heated until all three members have reached their austenitic states. The collapse might entail three distinct time-separated pulling stages occurring sequentially.

For yet another example, the first, second and third transition temperatures can all be different. In this example, the actuator 10 can be uniformly heated until one of the three members actuates defining a first stage of the collapse of the actuator 10. The actuator 10 can then be heated until another of the three members actuates defining a second stage of the collapse, and then heated until the last of the three members actuates defining a third stage of the collapse. It should be understood that these descriptions relate to an actuator having any number of trained thermally actuating members and so this example relates to an actuator having any number of stages in its actuation.

A thermal element 30 is illustrated in FIG. 3 electrically coupled to a controller 32. In this embodiment, the thermal element 30 comprises an inductive heating coil, a thermoelectric Peltier device, or a heating coil that heats by ohmic heating. The thermal element 30 is generally controlled by the controller 32. The thermal element is dimensioned for disposition about the first member 12 and for heating of the actuator 10. When disposed about the first member 12, the thermal element thermally actuates the actuator 10 by heating the actuator and heating each elongate member thereof above a respective transition temperature so that austenitic states are assumed (FIGS. 2 and 5). This represents a work stroke of the actuator 10. The actuator 10 can then be allowed to intrinsically reset by deactivating the thermal element 30, or removing the element from the actuator, and allowing the actuator to cool to ambient temperatures. The thermal element 30 preferably has a cross-sectional shape that corresponds to that of the actuator 10. For example, where the first member 12 has a circular cross-sectional shape as shown in FIG. 6, the thermal element 30 has a circular cross-sectional shape for disposition about the first member in contact with the first member for efficient thermal conduction. Similarly, where the first member 12 has a rectangular cross-sectional shape as shown in FIG. 8, the thermal element 30 has a congruent rectangular shape as shown in FIG. 9.

It should be understood that the role of the thermal element 30 is toward thermally actuating the actuator 10, wherein thermally actuating the actuator can entail invoking the actuator to do work and invoking the actuator to intrinsically reset. Thus, the thermal element 30 provides heating in some embodiments of the invention, provides cooling in other embodiments of the invention, and provides thermal cycling in yet other embodiments by providing both heating and cooling. The actuator 10 can be disposed in mild and harsh ambient conditions. The transition temperatures of the members of the actuator can vary across wide ranges because the ratios of the constituent ingredients of a shape memory alloy can be selected to obtain a desired transition temperature.

In the scenarios described herein with references to FIGS. 11-17, actuators are disposed in relatively cold environments where they are utilized in coupling components of a space vehicle, space station, or other assembly disposed outside of the atmosphere of the earth. An SMA actuator in such an environment can be thermally actuated toward austenitic states by providing heat. The SMA actuator can then be allowed to thermally actuate toward martensitic states to intrinsically reset the actuator by merely discontinuing the provision of heat and allowing the actuator to equilibrate with cold ambient conditions. Other scenarios are nonetheless within the scope of these descriptions. For example, an actuator can be provided in a hot environment with a thermal element that cools the actuator. Thus, the thermal element is generally capable of disposing the members of the actuator at temperatures other than those assumed when the actuator equilibrates with ambient conditions.

The thermal element 30 is dimensioned for disposition about the actuator 10, and in a sense, between the actuator and the environment about the actuator, for heating of the actuator from the outside. An additional or alternative thermal element can be provided that is dimensioned for disposition within the actuator 10. For example, one or more thermal elements can be disposed circumferentially between any two elongate tubular members of the actuator. A dedicated thermal element can be placed in thermal contact with each particular member of the actuator. Furthermore, a thermal element can be disposed within the third member 16 along the axis 18 for heating or cooling of the actuator from the inside.

With regard to stroke amplification benefits provided by the actuator 10, the arrangement of interconnected members as illustrated in FIGS. 4-5 derives stroke amplification gains from each of the members. The first member 12 has a proximal end 40 and distal end 42. The second member 14 has a proximal end 50 and a distal end 52. The third member has a proximal end 60 and a distal end 62. The distal end 42 of the first member 12 is linked to the distal end 52 of the second member 14 such that, when the first member shortens and lengthens, the distal end 52 of the second member travels with the distal end 42 of the first member relative to the proximal end 40 of the first member. Thus, when the first member shortens by the first distance 22, and the second member lengthens by the second distance 24, the proximal end 50 of the second member travels a first amplified distance 70 relative to the proximal end 40 of the first member. The first amplified distance 70, which is approximately the sum of the first distance 22 and the second distance 24, represents stroke amplification derived from the first member 12 and second member 14.

Furthermore, the proximal end 50 of the second member is coupled to the proximal end 60 of the third member 16. Thus, when the proximal end 50 of the second member travels the first amplified distance 70 relative to the proximal end 40 of the first member, the proximal end 60 of the third member travels approximately the same distance. Moreover, when the distal end 62 of the third member additionally travels the third distance 26 relative to the proximal end 60, the distal end 62 travels a second amplified distance 72 relative to the proximal end 40 of the first member. The second amplified distance 72 is approximately the sum of the first distance 22, the second distance 24, and the third distance 26. The second amplified distance 72 represents stroke amplification derived from all three members 12, 14 and 16.

For convenience, relative movement herein shall relate to movements relative to the proximal end 40 of the first member 12. For example, when the first member shortens, the distal end 42 travels by relative movement in the proximal direction 74. That is, when the first member shortens, the distal end 42 travels relative to the proximal end 40 in the proximal direction 74. Furthermore, when the first member lengthens, the distal end 42 travels by relative movement in the distal direction 76.

Upon heating of the actuator 10 such that all three members 12, 14 and 16 transform from their martensitic states (FIG. 4) to their austenitic states (FIG. 5), the overall length of the actuator is reduced by a stroke amplified distance. In particular the distal end 62 of the third member 16 travels by relative movement in the proximal direction 74 by the distance 72. This movement represents the work stroke of the actuator 10. Upon subsequent cooling of the actuator 10 such that each of the three members 12, 14 and 16 return to their martensitic states, the distal end 62 of the third member returns in the distal direction 76 by relative movement. This return represents the intrinsic resetting of the actuator 10. The actuator 10 is capable of repeated cycling through the work stroke and intrinsic resetting.

The various ends of the members of the actuator 10 are coupled together by flanges and connectors. For example, the distal end 42 of the first member 12 is coupled to the distal end 52 of the second member 14 by connectors 78. When the first member 12 shortens, the second member 14 is drawn by the connectors 78 to travel by relative movement in the proximal direction 74. The distal end 52 of the second member comprises a radially outwardly extending distal flange 54 that can abut the distal end 42 of the first member. When the first member 12 lengthens, the second member is drawn by both the connectors 78 and the distal flange 54 to travel by relative movement in the distal direction 76.

Furthermore, the proximal end 50 of the second member is coupled to the proximal end 60 of the third member 16 by connectors 80. When the second member 14 lengthens, the third member 16 is drawn by the connectors 80 to travel by relative movement in the proximal direction 74. The proximal end of the second member comprises a radially inwardly extending proximal flange 56 that abuts the proximal end 60 of the third member. When the second member shortens, the third member is drawn by the connectors 80 and the proximal flange 56 to travel by relative movement in the distal direction 76. The connectors 78 and 80 can be conventional connectors such as bolts, screws, rivets, cotter pins, press-fit pins, roll pins, keys, adhesives, and partially or fully circumferential clips. The connectors 78 and 80 can also represent welded connections and connections defined by mating helical threads.

The actuator 10 comprises end fittings so that the actuator can be conveniently attached to objects such brackets, bars, abutments, cables, and movable loads. A proximal end fitting 90 (FIG. 4) comprises a radially inwardly extending flange 92 that captures a proximal flange 82 that extends radially outwardly from the proximal end 40 of the first member 12. The proximal end fitting 90 comprises a proximal eye bolt 94 for attaching the proximal end fitting and the actuator 10 to an object. A distal end fitting 100 comprises a proximal extension 102 that is received by the distal end 62 of the third member 16. The distal end fitting 100 is connected to the third member by connectors 104. The connectors 104 can be conventional connectors such as bolts, screws, rivets, cotter pins, press-fit pins, roll pins, keys, adhesives, and partially or fully circumferential clips or rings. The connectors 104 can also represent welded connections and helical threads engaged with threads of the third member 16. The distal end fitting 100 comprises an eye-bolt 106 for attaching the distal end fitting and the actuator 10 to an object. The actuator 10, configured to pull by shortening when heated, can be attached to opposing objects by use of the proximal and distal end fittings and heated to apply tension forces between the opposing objects. An actuator configured to push by lengthening when heated could be attached to opposing objects and heated to apply compression forces between the opposing objects.

It should be apparent that these descriptions relate to actuators having three members as illustrated for the actuator 10 as shown in FIGS. 4-5, as well as to actuators having more or less than three members. For example, an actuator having many more than three members is shown in cross-sectional view in FIG. 10. In such an embodiment, a higher number of members is correlated with a higher degree of stroke amplification derived from all of the members. For example, where an SMA member is trained to vary in length by several percent, an actuator comprising an assembly of such SMA members that derives stroke amplification gains from all of the members can vary in overall length by considerably more than several percent. For example, an actuator comprising ten members that each vary in length by two percent upon thermal actuation might vary in overall length by twenty percent.

Although the embodiments of actuators shown in the figures comprise generally tubular members, other embodiments of actuators according to the invention comprise nested assemblies of elongate channel members that are each generally open along a side. For example, in one embodiment according to the invention, an actuator comprises an assembly of nested elongate channel members, wherein each channel member is U-shaped in cross section and defines an elongate channel. In this embodiment, a first outer channel member receives a second channel member in a nested arrangement. The second channel member optionally receives a third channel member in a nested arrangement. An actuator having any number of nested channel members is within the scope of these descriptions. Furthermore, linear actuators according to one or more embodiments of the invention can include flat plates and curved plates.

Actuators 110 having multiple elongate tubular members 112 are shown in FIGS. 10-17 in scenarios wherein they are utilized in clamping together modular components of a space vehicle, space station, or other assembly. Generally throughout these scenarios, the actuators 110 are configured to forcibly shorten when heated much like the actuator 10 of FIGS. 4-5. The actuator 10 and the actuators 110 each derive gains in stroke amplification from each constituent tubular member. The actuator 110 has more tubular members than the actuator 10 and therefore the stroke amplification exhibited by the actuator 110 may be greater than that of actuator 10. It should be noted that these drawings are not necessarily drawn to scale.

Each actuator 110 has a proximal end fitting 114 and distal end fitting 116 by which the actuator is attached to objects that are drawn closer when the actuator shortens upon being heated. FIGS. 11-14 demonstrate the closing and opening of a circumferential clamping ring 200 (FIG. 13) that comprises multiple arc sections 202 linked together by multiple actuators 110. The clamping ring 200, when actuated to close in the radially inward direction 290, clamps together adjacent sections of a cylindrical fuselage as shown in FIG. 17 and as further described in the following.

In FIG. 12, adjacent arc sections 202 of the clamping ring 200 (FIG. 13) are spaced such that the clamping ring assumes an open configuration characterized by a relatively expanded circumference. The arc sections 202 comprise abutments 204 by which the proximal and distal end fittings 114 and 116 are attached to respective arc sections. When the actuators 110 are heated and forcibly shorten, adjacent arc sections 202 are forcibly drawn together as shown in FIG. 11 such that the clamping ring assumes a closed configuration characterized by a minimized circumference. As shown in FIG. 14, each arc section 202 comprises a tensional strap 205 and a capture clamp 206 attached to the strap on the radially inner side of the strap. The capture clamp 206 defines a trapezoidal capture channel 208 that opens in the radially inward direction 290 toward the interior of the clamping ring 200 (FIG. 13), for capturing capture flanges of adjacent portions of a modular structure such as fuselage sections as shown in FIG. 17. The strap 205 is preferably formed of a material having tensional strength such as steel. The capture clamp 206 is preferably formed of a material such as aluminum or an alloy thereof that exhibits compressive strength and is optionally capable of slight deformations for distributing forces along surfaces contacted by the capture clamp.

In FIGS. 15-17, a first section 220 and a second section 250 of components of a modular space or terrestrial vehicle or assembly 210 are shown in partial cross sectional views. In FIG. 15, the sections 220 and 250 are disconnected from each other and are disposed ready for docking which entails latching and clamping. In FIG. 16, the sections are shown latched together. In FIG. 17, the sections are shown latched and clamped together. Respective skin portions 222 and 252 generally define the exterior surface 280 of the assembly 210 and separate the exterior 282 of the assembly from the generally cylindrical interior 284 of the assembly. In the scenario of FIGS. 15-17, first and second sections 220 and 250 might represent modular portions of a cylindrical fuselage or they might represent cylindrical docking portions of two vehicles. In any event, as will now be described, the sections are latched together by latching mechanisms 224 having linear actuators disposed parallel to the longitudinal axis 286, and are circumferentially clamped together by a clamping ring as represented by the section 202. It should be noted, that in another embodiment of a cylindrical fuselage, linear actuators are disposed parallel to a longitudinal axis of the fuselage along the exterior of the fuselage.

The process of latching the first section 220 and the second section 250 begins with FIG. 15, wherein respective radially outward extending capture flanges 226 and 256 are longitudinally spaced by a distance 288. An actuator 110 attached to the first section 220 is heated causing it to forcibly shorten. A travel bracket 228 is drawn by a coupling member 232 to travel toward the actuator 110 on rails 230 as the actuator forcibly telescopically collapses and shortens. As the bracket travels, a latch arm 234 that travels with the bracket 228 pivotally cams toward the second section 250. As the latch arm pivots, a latch hook 236 at the distal end of the latch arm 234 engages a latch tooth 254 attached to the second section 250 as shown in FIG. 16 and the distance between the sections is forcibly closed as the actuator 110 shortens and telescopically collapses. The first section 220 and second section 250 are shown latched together in FIG. 16 by the latching arm 234 and the latching tooth 254.

The process of clamping the first section 220 to the second section 250 begins with FIG. 16 wherein the sections are latched together. From this configuration of the assembly 210, the actuators 110 disposed circumferentially about the clamping ring 200 (FIG. 13) are heated to cause them to shorten such that the clamping ring 200 closes as represented by the section 202 in FIG. 16. As the clamping ring 200 (FIG. 13) closes, each arc section 202 travels in the radially inward direction 290 (FIG. 16) such that the trapezoidal capture channel 208 (FIG. 14) of the section 202 captures the respective capture flanges 226 and 256 of the first section 220 and second section 250 as shown in FIG. 17. A gasket or other sealing member may be disposed between the capture flanges such that the interior 284 of the assembly 210 is sealed upon clamping of the assembly as shown in FIG. 17.

Upon cooling of the longitudinally disposed actuators 110 of FIGS. 15-17 and the circumferentially disposed actuators 110 of FIGS. 11-13, the first section 220 and second section 250 of the assembly 210 can be separated for undocking. Each actuator 110 may comprise a thermal element 30 (FIG. 3) for thermally actuating the actuators.

An alternative embodiment of a circumferential clamping ring 300 is shown in FIGS. 18-19. Unlike the clamping ring 200 of FIGS. 13-14 which comprises multiple arc sections 202 linked together by actuators 11, the clamping ring 300 of FIGS. 18-19 comprises a continuous circular band formed of trained SMA material. In particular, the clamping ring 300 is trained to close toward the radially inward direction 290 upon heating. The clamping ring 300 defines a capture channel 308 (FIG. 19) that opens in the radially inward direction 290 for capturing flanges, for example the capture flanges 226 and 256 (FIG. 17), when the ring 300 is heated.

Thus the actuator 10 (FIGS. 1-9), and the actuator 110 (FIGS. 10-17) provide improved stroke amplification by deriving gains from interconnected SMA members. These actuators each include at least one member trained to lengthen when heated, and at least one member trained to shorten when heated, and the members are coupled together to derive stroke amplification gains from each member. These actuators include telescoping assemblies of tubular members. By training of the tubular members, the assemblies can be configured to expand or collapse upon heating.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A stroke-amplifying linear actuator comprising:
   an elongate first member comprising a proximal end and a first shape memory alloy, the first member configured to shorten by a first distance when the first shape memory alloy is heated; and
   an elongate second member having two opposing ends and comprising a second shape memory alloy, the second member configured to lengthen by a second distance when the second shape memory alloy is heated;
   wherein the second member is coupled to the first member such that at least one end of the second member travels an amplified distance relative to the proximal end of the first member at a time when the first member is shortened by the first distance and the second member is lengthened by the second distance, the amplified distance being greater than either of the first distance and the second distance.

2. A linear actuator according to claim 1, wherein:
   the second member travels in a first direction relative to the proximal end of the first member when the first member shortens; and
   the second member comprises a proximal end that travels in the first direction relative to the proximal end of the first member when the second member lengthens.

3. A linear actuator according to claim 1, wherein the amplified distance is at least as great as the sum of the first distance and the second distance.

4. A linear actuator according to claim 1, wherein:
   the first shape memory alloy has a first transition temperature; and
   the first member is configured to shorten when the first shape memory alloy is heated from below the first transition temperature to above the first transition temperature.

5. A linear actuator according to claim 4, wherein:
   the first shape memory alloy obtains a martensitic state such that the first member obtains a first length when the temperature of the first shape memory alloy is below the first transition temperature;
   the first shape memory alloy obtains an austenitic state such that the first member obtains a second length when the temperature of the first shape memory alloy is above the first transition temperature; and
   the first length is greater than the second length.

6. A linear actuator according to claim 4, wherein the first member is configured to lengthen when the first shape memory alloy cools from above the first transition temperature to below the first transition temperature.

7. A linear actuator according to claim 4, wherein:
   the second shape memory alloy has a second transition temperature; and
   the second member is configured to lengthen when the second shape memory alloy is heated from below the second transition temperature to above the second transition temperature.

8. A linear actuator according to claim 7, wherein the first transition temperature is approximately the same as the second transition temperature.

9. A linear actuator according to claim 1, further comprising a thermal element for causing a temperature change in at least the first shape memory alloy.

10. A linear actuator according to claim 1, further comprising a heating element for heating at least the first shape memory alloy or the second shape memory alloy.

11. A linear actuator according to claim 1, wherein the first member comprises a tubular portion, and, wherein at least a portion of the second member is surrounded by the tubular portion of the first member.

12. A linear actuator according to claim 1 further comprising an elongate third member that comprises a proximal portion, and a third shape memory alloy, the third member configured to shorten when the third shape memory alloy is heated, wherein:
   the first member comprises a distal tubular portion;
   the second member comprises a proximal portion surrounded by the distal tubular portion of the first member, and a tubular distal portion surrounding at least the proximal portion of the third member.

13. A linear actuator according to claim 1, further comprising:
   a telescoping sub-assembly of tubular members, the sub-assembly comprising an outer tubular member, at least one inner tubular member and at least one shape memory alloy;
   wherein the second member comprises a tubular distal portion that at least partially surrounds the outer tubular member of the telescoping sub-assembly.

14. A stroke-amplifying thermally actuatable telescoping assembly comprising:
   an elongate tubular first member comprising a first shape memory alloy; and
   an elongate second member comprising a second shape memory alloy; the second member at least partially surrounded by the tubular first member;
   wherein either the first member and the second member are both configured to lengthen by respective distances when thermally actuated or they are both configured to shorten by respective distances when thermally actuated;
   wherein the second member is operably coupled to the first member such that a portion of the second member moves linearly relative to a portion the first member by an amplified distance at a time when the first member and the second member are both thermally actuated; and
   wherein the amplified distance is greater than any one said respective distance.

15. An assembly according to claim 14, wherein:
   the first member comprises a proximal end and a distal portion;
   the second member comprises a proximal portion and a distal end;
   the telescoping assembly further comprises a third member at least partially surrounded by the tubular first member; and
   the proximal portion of the second member is operably coupled to the distal portion of the first member by the third member such that the distal end of the second member moves linearly relative to the proximal end of the first member when the assembly is thermally actuated.

16. An assembly according to claim 15, wherein, when the assembly is thermally actuated:
   the distal portion of the first member moves by a first distance relative to the proximal end of the first member;
   the distal end of the second member moves by a second distance relative to the proximal portion of the second member; and
   the distal end of the second member moves by the amplified distance, which is more than the first distance and more than the second distance.

17. An assembly according to claim 16, wherein the amplified distance is at least as great as the sum of the first distance and the second distance.

18. An assembly according to claim 16, wherein:
   the third member comprises a distal portion, a proximal portion, and a third shape memory alloy;
   the proximal portion of the third member moves a third distance relative to the distal portion of the third member when the assembly is thermally actuated; and
   the amplified distance is more than the third distance.

19. An assembly according to claim 18, wherein the amplified distance is at least as great as the sum of the first distance, the second distance, and the third distance.

20. An assembly according to claim 16, wherein:
   the first member is configured to shorten when the first shape memory alloy is heated;
   the second member is configured to shorten when the second shape memory alloy is heated; and
   the third member is configured to lengthen when the third shape memory alloy is heated.

21. An assembly according to claim 14, wherein:
   the first member is configured to shorten when the first shape memory alloy is heated; and
   the second member is figured to shorten when the second shape memory alloy is heated.

22. A telescoping actuator according to claim 14, wherein:
   the telescoping assembly further comprises a telescoping sub-assembly of tubular members, the sub-assembly comprising an outer member at least partially surrounded by the tubular first member, an inner member at least partially surrounding the second member, and at least one shape memory alloy; and
   the second member is operably coupled to the first member by way of the sub-assembly such that the portion of the second member moves linearly relative to the first member when the telescoping assembly is thermally actuated.

23. A stroke-amplifying thermally actuatable coaxial assembly comprising:
   an elongate first member disposed along an axis, the first member comprising a first proximal portion, a first distal portion, and a first shape memory alloy configured to forcibly change the distance between the first proximal portion and the first distal portion by a first distance when thermally actuated;
   an elongate second member disposed along the axis, the second member comprising a second proximal portion, a second distal portion, and a second shape memory alloy configured to forcibly change the distance between the second proximal portion and the second distal portion by a second distance when thermally actuated; and
   an intervening member disposed along the axis, the intervening member operably coupling the first distal portion to the second proximal portion such that the second proximal portion is moved forcibly along the axis by the intervening member relative to the first proximal portion when the first shape memory alloy is thermally actuated, and such that the second distal portion is moved forcibly along the axis relative to the first proximal portion by an amplified distance that is greater than the first distance and greater than the second distance at a time when the first shape memory alloy and the second shape memory alloy are both thermally actuated.

24. An assembly according to claim 23, wherein:
the first distal portion is tubular;
at least a portion of the intervening member is disposed within the tubular first distal portion;
at least a portion of the intervening member is tubular; and
at least a portion of the second member is disposed within the tubular portion of the intervening member.

25. An assembly according to claim 23, wherein:
the first shape memory alloy has a first transition temperature about which the alloy is configured to forcibly change the distance between the first proximal portion and the first distal portion;
the second shape memory alloy has a second transition temperature about which the alloy is configured to forcibly change the distance between the second proximal portion and the second distal portion.

* * * * *